Aug. 9, 1960 G. SCHNEIDER ET AL 2,948,766

TUNGSTEN/RHENIUM THERMOCOUPLES

Filed April 30, 1956

INVENTORS,
GÜNTHER SCHNEIDER,
ALFRED BOETTCHER,

BY Bailey, Stephens & Huettig
ATTORNEYS

United States Patent Office 2,948,766

Patented Aug. 9, 1960

2,948,766

TUNGSTEN/RHENIUM THERMOCOUPLES

Günther Schneider, Frankfurt (Main), Eschersheim, and Alfred Boettcher, Hanau (Main), Hohe Tanne, Germany, assignors to Deutsche Gold- und Silber-Scheideanstalt vormals Roessler, Frankfurt am Main, Germany Filed Apr. 30, 1956, Ser. No. 581,478

Claims priority, application Germany Apr. 30, 1955

10 Claims. (Cl. 136—5)

The invention relates to apparatus for measurement of high temperatures and especially those between 1500 and 2000° C. with the aid of thermocouples comprising a substantially pure tungsten element joined to a rhenium element.

It is known to employ thermoelements in the form of the so-called thermocouples for the measurement of temperatures. The best known thermocouple elements are those of nickel/chromium-nickel and platinum/platinum-rhodium.

The simplicity of the use of thermocouples, as well as their accuracy, renders it desirable to provide thermocouples for use at temperatures above 1500° C. However, up until now, the previous attempts employing combinations of the known high melting metals have led only to limited solutions. The thermocouples produced either did not meet the technological requirements or were only of limited application. The reason for this was that the wire employed for the thermocouples either still had too low a melting point or the sensitivity thereof, especially against thermal influences, which can easily lead to undesirable embrittlement and therefore early destruction of the elements or at least to a diminished accuracy. In a similar manner, a change in alloy composition through evaporation of one of the alloy components during use of thermocouples at high temperatures can lead to difficulties. Also, in platinum metals, the sensitivity to the so-called platinum poisons is disadvantageous. Furthermore, it is, of course, also necessary to select such combinations for thermocouples that a sufficiently high thermoelectric E.M.F. is provided. For example, thermocouples of Ta/W, Mo/Ta and Mo/W only provide a relatively low thermoelectric E.M.F. and also the change in thermoelectric E.M.F. with change in temperature is too low for practical purposes.

According to the invention, it was found that excellent thermocouples for the measurement of high temperatures could be produced by joining a substantially pure tungsten or molybdenum element with a rhenium element, preferably of pure rhenium, to form the hot junction. It was also found that certain iridium-rhenium alloys could also be employed in combination with the substantially pure tungsten or molybdenum elements, namely, iridium-rhenium alloys of the following composition: 10–30%, preferably about 20%, of iridium and the remainder rhenium and 10 to 25%, preferably about 20%, of rhenium and the remainder iridium, as within these composition ranges the change in thermoelectric E.M.F., with small changes in composition of the alloys as might occur by evaporation of one of the components thereof as by oxidation, is at a minimum so that changes in electromotive E.M.F. produced in use are maintained so low as to be acceptable.

Preferably, the thermocouples according to the invention are sealed in suitable gas tight armatures or casings in a known manner to protect them fully from the influence of the atmosphere. Preferably, such armatures are tubes of metal oxides, such as aluminum oxide, beryllium oxide, thorium oxide or zirconium oxide, preferably filled with hydrogen to provide a non-oxidizing atmosphere around the thermocouple.

The following Table I gives the thermoelectric E.M.F. in m. volts of a thermocouple produced by joining a substantially pure tungsten wire with a substantially pure rhenium wire at temperatures from 500° C. to 2100° C., as well as the change in thermoelectric E.M.F. for 1° C. change in temperature in μvolts:

*Table I*

| Temperature, ° C. | E m.v. | DE/*dt* μv./° C. |
|---|---|---|
| 500 | 6.04 | 18.3 |
| 1,000 | 16.34 | 19.6 |
| 1,500 | 25.58 | 13.6 |
| 1,800 | 29.30 | ---------- |
| 1,900 | 30.34 | ---------- |
| 2,000 | 31.30 | 7.5 |
| 2,100 | 32.05 | ---------- |

The following Table II, on the other hand, gives the thermoelectric E.M.F. in m. volts of thermocouples produced by joining pure tungsten wires with rhenium-iridium alloy wires of various compositions at temperatures between 500° C. and 2000° C.:

*Table II*

| Temperature, ° C. | Composition of rhenium-iridum alloy wire in percent | | | | | | | | |
|---|---|---|---|---|---|---|---|---|---|
| | Ir 90 Re 10 | Ir 80 Re 20 | Ir 70 Re 30 | Ir 60 Re 40 | Ir 50 Re 50 | Ir 40 Re 60 | Ir 30 Re 70 | Ir 20 Re 80 | Ir 10 Re 90 |
| 500 | 3.83 | 4.13 | 4.19 | 3.86 | 3.70 | 3.88 | 4.27 | 4.33 | 4.49 |
| 1,000 | 13.10 | 13.33 | 12.75 | 11.94 | 11.15 | 11.47 | 12.09 | 12.38 | 13.22 |
| 1,500 | 24.25 | 24.18 | 22.82 | 21.21 | 19.55 | 19.26 | 19.80 | 20.27 | 21.09 |
| 2,000 | 34.86 | 33.66 | 32.45 | 30.22 | 27.17 | 25.47 | 25.93 | 26.71 | 27.71 |

The thermocouples according to the invention in using rhenium as one of the elements are of lower cost than thermocouples employing a platinum metal, such as iridium, and also avoid the difficulties engendered by the alteration of the structure of pure iridium elements when used at high temperatures.

As indicated above, it is preferable to protect the thermocouples according to the invention against influence of the atmosphere by providing a non-metallic gas tight casing for the thermocouples themselves. It is known that high melting oxides, such as aluminum oxide, zirconium oxide, thorium oxide and others, when suitably pure, can be sintered to produce practically gas tight shaped bodies. Such shaped bodies have already been employed as protective tubes for thermoelements. However, for the purposes of the invention, it is important that every influence of the atmosphere, especially of oxygen containing gases, be excluded with certainty. This, for example, can be accomplished by filling the casings containing the thermocouples according to the invention with inert gases or to continuously flush the casings with gases which have no deleterious effect upon the materials of the thermocouples at the temperatures to be measured. In accordance with an advantageous modification according to the invention, it has been found desirable to introduce a getter metal into the casing to remove any last traces of air or oxygen. The getters can be introduced into the casing either in powder form or as shaped bodies. Getter metals, such as titanium, tantalum, thorium or zirconium, are capable of binding gases such as oxygen, nitrogen or vapors of metalloids with the formation of solid compounds at elevated temperatures, such as when the thermocouple is heated up to measuring temperature for the first time.

According to another modification of the invention, the non-metallic protective casings for the thermocouples can be provided with a glaze-like coating of mixtures of higher melting oxides and appropriate quantities of fluxing oxides in order to ensure a gas tight seal. Such oxide mixtures are especially desirable for bonding and sealing the joints in the casing when it is not made of one piece. Preferably, the composition of the glazes is selected so that its melting or softening point can be selected with regard to the temperatures to be measured between 1000° C. and 1700° C. These glazes wet the non-metallic material of the casings upon fusion and form a uniform firmly adhering coating. The bond of such coatings is improved by the fact that they generally dissolve minor amounts of the ceramic casing material upon which they are applied. Furthermore, the composition of the oxide mixtures employed for the glaze is easily adjusted so that the coefficient of heat expansion of the glaze does not differ substantially from that of the ceramic casing. The solvent capacity of the oxide mixtures employed for the glazes for the material, for example, aluminum oxide or zirconium oxide, of the casing also renders it possible to use such oxide mixtures to seal the casing and especially the joints thereof for thermocouples to be used in measuring temperatures of up to 2100° C., even though such temperatures substantially exceed the actual melting point of such oxide mixtures, without danger of failure of the seal. Oxide mixtures which can be used either to form a glazed coating on the casing or to bond the joints between separate parts of the casings are given by way of example in the following table:

same material as tube 11. Sealing mass 15 seals the joint between tube 11 and support 12 and sealing mass 16 provides a seal at the end of support 12 where the wires of the thermocouple 12 leave such support. The sealing mass is a mixture of oxides such as given in Table III. An outer glaze coating 17 of the same material is provided on tube 11.

In the modification shown in Fig. 2, the thermocouple 24 comprises a pure tungsten wire joined with a pure rhenium wire at terminal or point 25 to form the hot junction of the thermocouple. One of the wires of such thermocouple is provided with a sintered aluminum oxide insulating tube 22 and the other with a plurality of short insulating tubes 23 of the same material. A protective tube 21 of aluminum sintered oxide surrounds the hot junction of the thermocouple and the open end thereof is sealed off with the aid of stopper 26 of sintered aluminum oxide and sealing masses 27 and 28 of an oxide mixture such as given in Table III. A tube 29 of a getter metal, such as titanium, is provided within protective tube 21. An outer glaze coating 30 is also provided on the tube 11.

We claim:

1. A thermocouple comprising a substantially pure tungsten element joined with a rhenium element selected from the group consisting of a substantially pure rhenium element, rhenium-iridium alloy elements containing 10 to 30% of iridium and iridium-rhenium alloy elements containing 10 to 25% of rhenium.

2. A thermocouple comprising a substantially pure tungsten element joined with a substantially pure rhenium element.

3. A thermocouple comprising a substantially pure tungsten element joined with a rhenium-iridium alloy element containing 10 to 30% of iridium.

4. A thermocouple comprising a substantially pure tungsten element joined with an iridium-rhenium alloy containing 10 to 25% of rhenium.

5. A thermoelectric element comprising a thermocouple comprising a substantially pure tungsten element joined with a substantially pure rhenium element sealed in a gas tight casing of non-metallic thermostable material.

6. A thermoelectric element comprising a thermocouple comprising a substantially pure tungsten element joined

*Table III*

| Melting Point | $Al_2O_3$ | $B_2O_3$ | BeO | CaO | $Fe_2O_3$ | MgO | $SiO_2$ | $TiO_2$ | $V_2O_5$ | $ZrO_2$ |
|---|---|---|---|---|---|---|---|---|---|---|
| ca. 1,200° | 11 | 5 | -------- | 70 | 7 | -------- | 7 | -------- | -------- | -------- |
| ca. 1,300° | -------- | 10 | -------- | 40 | -------- | -------- | 40 | 10 | -------- | -------- |
| ca. 1,300° | 18 | -------- | -------- | 65 | 4 | -------- | 10 | -------- | 3 | -------- |
| ca. 1,400° | -------- | -------- | -------- | 30 | -------- | -------- | 30 | 40 | -------- | -------- |
| ca. 1,500° | 40 | -------- | -------- | 50 | -------- | 10 | -------- | -------- | -------- | -------- |
| ca. 1,600° | 25 | -------- | 20 | 15 | -------- | 10 | 10 | 10 | -------- | 10 |
| ca. 1,700° | 20 | -------- | 10 | 15 | -------- | 20 | 10 | 5 | -------- | 20 |

The accompanying drawings illustrate several modifications of thermocouple elements according to the invention.

Figure 1:
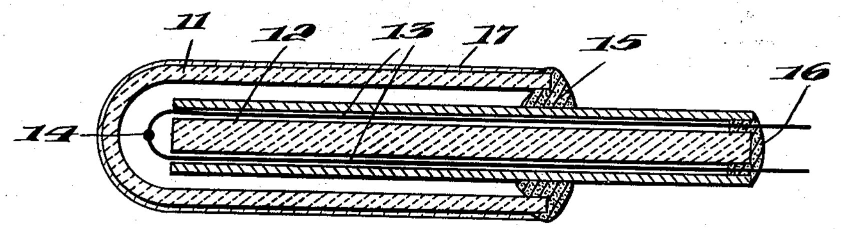
Fig. 1 shows a longitudinal section of one form of such an element.
Figure 2:
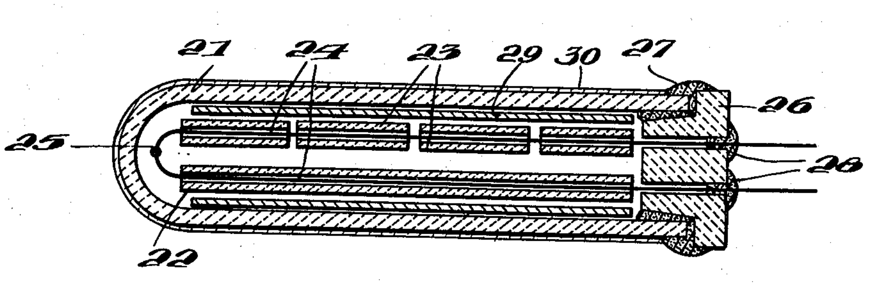
Fig. 2 shows a longitudinal section of another form of such an element.

In the modification shown in Fig. 1, the thermocouple 13 comprises a pure tungsten wire joined with a pure rhenium wire at terminal or point 14 to form the hot junction of the thermocouple. A protective tube 11 of a high melting oxide, for example, sintered aluminum oxide, surrounds the hot junction and the wires of the thermocouple are supported in the two capillaries provided in support 12 which preferably is formed of the with a substantially pure rhenium element sealed under a non oxidizing gas in a gas tight casing of non-metallic thermostable material.

7. A thermoelectric element comprising a thermocouple comprising a substantially pure tungsten element joined with a substantially pure rhenium element sealed together with a getter in a gas tight casing of non-metallic thermostable material.

8. A thermoelectric element comprising a thermocouple comprising a substantially pure tungsten element joined with a substantially pure rhenium element sealed in a gas tight casing of a sintered oxide.

9. A thermoelectric element comprising a thermocouple comprising a substantially pure tungsten element joined with a substantially pure rhenium element sealed in a gas tight casing of a sintered oxide provided with a glaze having a softening point between 1000° C. and 1700° C. composed of a mixture of oxides and a flux.

10. A thermocouple which comprises one element composed of rhenium and another element composed of a refractory metal from the group consisting of tungsten and molybdenum, said elements being joined at one end.

References Cited in the file of this patent

UNITED STATES PATENTS

| | | |
|---|---|---|
| 2,012,465 | Godecke | Aug. 17, 1935 |

FOREIGN PATENTS

| | | |
|---|---|---|
| 190,657 | Great Britain | Dec. 28, 1922 |